US011135544B2

(12) United States Patent
Suzuki et al.

(10) Patent No.: US 11,135,544 B2
(45) Date of Patent: Oct. 5, 2021

(54) ACIDIC GAS ABSORBENT, ACIDIC GAS REMOVAL METHOD AND ACIDIC GAS REMOVAL APPARATUS

(71) Applicants: KABUSHIKI KAISHA TOSHIBA, Minato-ku (JP); TOSHIBA ENERGY SYSTEMS & SOLUTIONS CORPORATION, Kawasaki (JP)

(72) Inventors: Akiko Suzuki, Ota (JP); Yoshihiko Nakano, Yokohama (JP); Reiko Yoshimura, Kawasaki (JP); Toshihiro Imada, Kawasaki (JP); Takashi Kuboki, Ota (JP); Kenji Sano, Nerima (JP); Shinji Murai, Sagamihara (JP); Mitsuru Udatsu, Kawasaki (JP)

(73) Assignees: KABUSHIKI KAISHA TOSHIBA, Minato-ku (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 16/297,111

(22) Filed: Mar. 8, 2019

(65) Prior Publication Data

US 2020/0047110 A1  Feb. 13, 2020

(30) Foreign Application Priority Data

Aug. 7, 2018  (JP) .............................. JP2018-148789

(51) Int. Cl.
*C07D 233/04* (2006.01)
*C07D 233/20* (2006.01)
(Continued)

(52) U.S. Cl.
CPC ..... *B01D 53/1475* (2013.01); *B01D 53/1425* (2013.01); *B01D 53/18* (2013.01);
(Continued)

(58) Field of Classification Search
None
See application file for complete search history.

(56) References Cited

U.S. PATENT DOCUMENTS 4,104,220 A * 8/1978 Sims ................... C09D 131/02
524/548
4,111,877 A * 9/1978 Dixon .................. C07D 233/36
524/809

(Continued)

FOREIGN PATENT DOCUMENTS

JP  2006-136885 A  6/2006
JP  2010-155753 A  7/2010
(Continued)

OTHER PUBLICATIONS

Aventis Pharma, et al. v. Lupin Ltd., et al., 2006 BL 78191, 2006 Us Dist Lexis 31960, Civil Action No. 2:05cv421 (E.D. Va, May 11, 2006) (also available online at https://casetext.com/case/aventis-pharma-deutschland-gmbh-v-lupin-ltd ).*

(Continued)

*Primary Examiner* — Daniel Berns
(74) *Attorney, Agent, or Firm* — Oblon, McClelland, Maier & Neustadt, L.L.P.

(57) ABSTRACT

The embodiments provide an acidic gas absorbent, an acidic gas removal method using the absorbent, and an acidic gas removal apparatus using the absorbent. The absorbent absorbs an acidic gas in a large amount and is hardly diffused. The acidic gas absorbent according to the embodiment comprises an amine compound represented by the following formula (1):

(Continued)

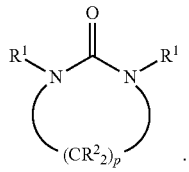

(1)

6 Claims, 1 Drawing Sheet

(51) Int. Cl.

| | | |
|---|---|---|
| *C07D 233/22* | (2006.01) | |
| *C07D 233/24* | (2006.01) | |
| *B01D 53/14* | (2006.01) | |
| *B01D 53/18* | (2006.01) | |
| *B01D 53/78* | (2006.01) | |
| *B01D 53/62* | (2006.01) | |

(52) U.S. Cl.
CPC .............. *B01D 53/62* (2013.01); *B01D 53/78* (2013.01); *B01D 2252/20415* (2013.01); *B01D 2252/20421* (2013.01); *B01D 2252/20426* (2013.01); *B01D 2252/20431* (2013.01); *B01D 2252/20463* (2013.01); *B01D 2252/20473* (2013.01)

(56) References Cited

U.S. PATENT DOCUMENTS

| | | | | |
|---|---|---|---|---|
| 5,194,607 | A * | 3/1993 | Patsch | C09B 62/021 544/67 |
| 5,746,946 | A * | 5/1998 | He | C07D 233/32 252/392 |
| 5,759,486 | A * | 6/1998 | Peterson | A61L 2/12 219/687 |
| 6,538,143 | B1 * | 3/2003 | Pinschmidt, Jr. | C07C 275/10 526/263 |
| 7,419,646 | B2 | 9/2008 | Cadours et al. | |
| 8,506,913 | B2 | 8/2013 | Murai et al. | |
| 8,545,783 | B2 | 10/2013 | Murai et al. | |
| 8,747,521 | B2 | 6/2014 | Sano | |
| 9,409,119 | B2 | 8/2016 | Murai et al. | |
| 9,446,346 | B2 | 9/2016 | Murai et al. | |
| 9,724,642 | B2 | 8/2017 | Murai et al. | |
| 10,046,269 | B2 | 8/2018 | Murai et al. | |
| 2013/0343974 | A1 | 12/2013 | Murai et al. | |
| 2015/0044114 | A1 | 2/2015 | Murai et al. | |
| 2017/0001142 | A1 | 1/2017 | Rayner et al. | |
| 2017/0266607 | A1 | 9/2017 | Watando et al. | |
| 2018/0272267 | A1 | 9/2018 | Kondo et al. | |
| 2019/0083921 | A1 | 3/2019 | Suzuki et al. | |
| 2019/0083922 | A1 | 3/2019 | Suzuki et al. | |
| 2019/0160422 | A1 | 5/2019 | Murai et al. | |

FOREIGN PATENT DOCUMENTS

| | | |
|---|---|---|
| JP | 2012-143744 A | 8/2012 |
| JP | 2012-245483 A | 12/2012 |
| JP | 2014-97498 A | 5/2014 |
| JP | 5526055 B2 | 6/2014 |
| JP | 5659084 B2 | 1/2015 |
| JP | 5659127 B2 | 1/2015 |
| JP | 5659128 B2 | 1/2015 |
| JP | 2015-29987 A | 2/2015 |
| JP | 2015-71136 A | 4/2015 |
| JP | 5713997 B2 | 5/2015 |
| JP | 2015-107443 A | 6/2015 |
| JP | 2015-112574 A | 6/2015 |
| JP | 2015-199007 A | 11/2015 |
| JP | 5868795 B2 | 2/2016 |
| JP | 2016-93793 A | 5/2016 |
| JP | 2016-198714 A | 12/2016 |
| JP | 2017-35669 A | 2/2017 |
| JP | 2017-507771 A | 3/2017 |
| JP | 2017-121610 A | 7/2017 |
| JP | 6173817 B2 | 8/2017 |
| JP | 2017-164696 A | 9/2017 |
| JP | 2017-164697 A | 9/2017 |
| JP | 2017-196547 A | 11/2017 |
| JP | 2018-122278 A | 8/2018 |
| JP | 2018-158302 A | 10/2018 |
| JP | 2018-183729 A | 11/2018 |
| JP | 2019-55371 A | 4/2019 |
| JP | 2019-55394 A | 4/2019 |
| JP | 2019-98284 A | 6/2019 |
| JP | 2019-98316 A | 6/2019 |

OTHER PUBLICATIONS

Ex parte Silcock, Appeal No. 2012-009664 (PTAB Jun. 2, 2014) (available online at https://e-foia.uspto.gov/Foia/RetrievePdf?system=BPAI&flNm=fd2012009664-05-29-2014-1).*

"Imidazoles." Yick-Vik Chemicals & Pharmaceuticals (HK) Ltd. (c)2016 (excerpts). Viewed on Jan. 25, 2021 at http://www.yickvic.com/Catalog/Functional_Group_Imidazoles.pdf.*

* cited by examiner

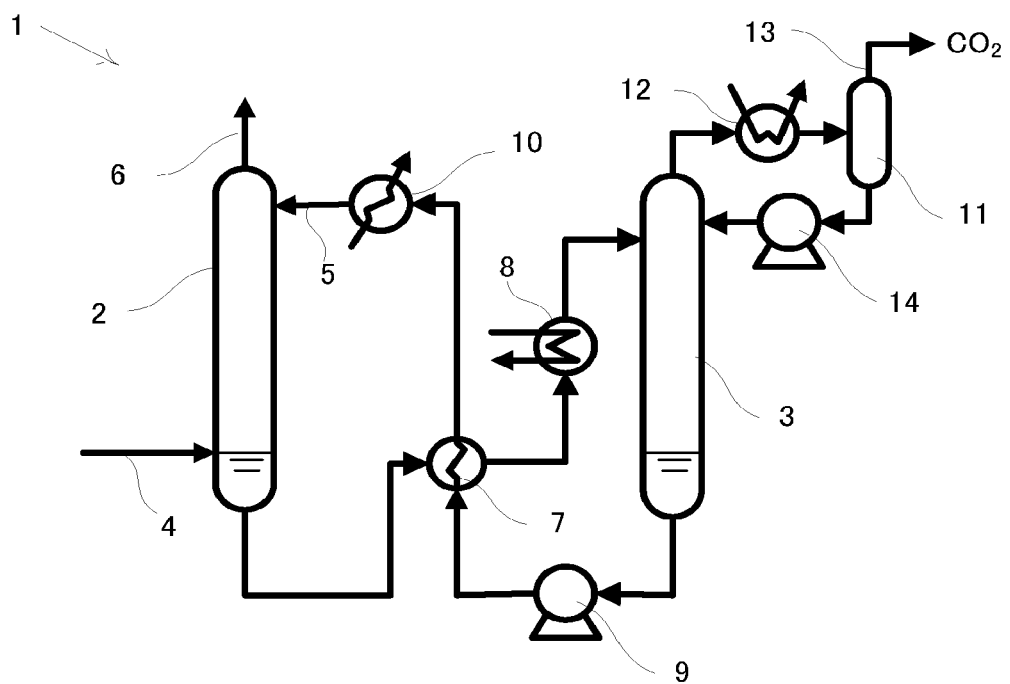

ACIDIC GAS ABSORBENT, ACIDIC GAS REMOVAL METHOD AND ACIDIC GAS REMOVAL APPARATUS

CROSS-REFERENCE TO RELATED APPLICATIONS

This application is based upon and claims the benefit of priority from the prior Japanese Patent Application No. 2018-148789, filed on Aug. 7, 2018, the entire contents of which are incorporated herein by reference.

FIELD

Embodiments of the present disclosure relate to an acidic gas absorbent, an acidic gas removal method and an acidic gas removal apparatus.

BACKGROUND

It has been recently pointed out that global warming is partly attributed to greenhouse effect caused by increase of carbon dioxide ($CO_2$) concentration, and it is urgent to take international measures to protect global environment. Carbon dioxide ($CO_2$) is largely generated by industrial activities, and there is an increasing momentum toward reduction of $CO_2$ emitted into the atmosphere. In particular, it is urgently necessary to reduce $CO_2$ emission from coal-fired power plants and factories. Further, it is also desired to reduce emission of acidic gases other than $CO_2$, such as hydrogen sulfide ($H_2S$).

In view of that, as means for reducing emission of acidic gases such as $CO_2$, much attention is paid to not only streamlining of thermal power plants or the like for emission reduction but also $CO_2$ recovery by use of chemical absorbents. As practical chemical absorbents, amine compounds have been studied for a long time. However, it is known that, when adopted for $CO_2$ absorption and desorption process, the absorbents are often heated to regenerate and thereby amine compounds contained therein may be diffused into the atmosphere. If amine compounds are diffused into the atmosphere in great amounts, there is a fear of unfavorable influences on surrounding environments of the processing plant. Accordingly, the plant is generally provided with amine traps made of water or acids so as to prevent diffusion of amine compounds.

It is thus necessary to install amine traps, but even so the amine traps are not always able to fully prevent diffusion of the absorbents.

BRIEF DESCRIPTION OF THE DRAWINGS

FIG. 1 schematically shows an acidic gas removal apparatus according to the embodiment.

DETAILED DESCRIPTION

The acidic gas absorbent according to an embodiment of the present disclosure comprises: an amine compound represented by the following formula (1):

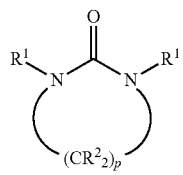

in which
each $R^1$ is independently hydrogen, an alkyl group, or a primary or secondary amino-containing aminoalkyl group provided that at least one of $R^1$s is the aminoalkyl group,
each $R^2$ is independently hydrogen, an alkyl group, hydroxy, amino, hydroxyamino, or a primary or secondary amino-containing aminoalkyl group,
the alkyl or aminoalkyl group contained in $R^1$ or $R^2$ has a straight-chain or branched-chain skeleton and may be substituted with hydroxy or carbonyl, and
p is 2 to 4.

Further, in the acidic gas removal method according to another embodiment of the present disclosure, a gas containing an acidic gas is brought into contact with the above acidic gas absorbent so as to remove the acidic gas from the acidic gas-containing gas.

Furthermore, the acidic gas removal apparatus according to still another embodiment of the present disclosure comprises:
an absorption unit in which a gas containing an acidic gas is brought into contact with the above acidic gas absorbent, so that the absorbent absorbs the acidic gas to remove it from the acidic gas-containing gas; and
a regeneration unit in which the absorbent holding the acidic gas is made to desorb the acidic gas so as to be regenerated;
so that the absorbent regenerated in the regeneration unit is reused in the absorption unit.

Embodiments will now be explained with reference to the accompanying drawings.

In the following description, the embodiments will be explained mainly in case examples where the acidic gas is carbon dioxide ($CO_2$). However, the acidic gas absorbent according to the embodiment can give the same effect on other acidic gases such as hydrogen sulfide. Specifically, the absorbent of the embodiment is particularly suitable to absorb oxidizing gases such as carbon dioxide and hydrogen sulfide.

The acidic gas absorbent according to the embodiment contains a particular amine compound represented by the following formula (1):

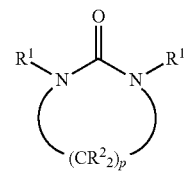

In the formula, each $R^1$ is independently hydrogen, an alkyl group, or a primary or secondary amino-containing aminoalkyl group. The number of carbon atoms in the alkyl or aminoalkyl group is not particularly restricted, but is normally 1 to 10, preferably 2 to 6, more preferably 2 or 3. The alkyl or aminoalkyl group may be substituted with hydroxy or carbonyl.

In the embodiment, at least one of $R^1$s must be the aminoalkyl group. This means that the compound of the formula (1) contains at least one primary or secondary amino, which works in the absorbent to react with the acidic gas.

Each $R^2$ is independently hydrogen, an alkyl group, hydroxy, amino, hydroxyamino, or a primary or secondary amino-containing aminoalkyl group. There may be two or more $R^2$s in the formula (1), and all of them may be the same as or different from each other. The alkyl or aminoalkyl group has a straight-chain or branched-chain skeleton and may be substituted with hydroxy or carbonyl. All of $R^2$s are preferably hydrogens.

In the formula, p is 2 to 4, preferably 2 or 3. This means that the compound of the formula (1) preferably has an imidazolidin-2-one or hexahydropyrimidine-2-one skeleton.

In the embodiment, "primary amino" means a group of —$NH_2$ and "secondary amino" means a group of —NHR' (where R' is an alkyl or aminoalkyl group).

The amine compound may have hydroxy groups unless they impair the effect of the embodiment because hydroxy groups have an effect of improving solubility of the compound. However, they often lower stability of the compound and hence the amine compound preferably contains no hydroxy groups. Further, the amine compound also preferably contains no acid groups such as carboxy (—C(=O)OH) and sulfo (—$SO_3H$) because they decrease pH value of the compound to disturb absorption of acidic gas.

The compound is preferably represented by the following formula (1-a):

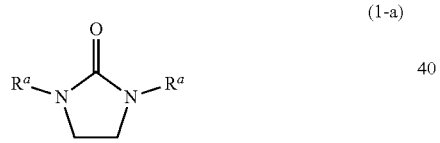

(1-a)

in which each $R^a$ is independently hydrogen or a group represented by —$(C_mH_{2m})$—NH—$(C_nH_{2n+1})$ where m and n are 1 to 3 and 0 to 3, respectively. The group —$(C_mH_{2m})$—NH—$(C_nH_{2n+1})$ may have either a straight-chain skeleton or a branched-chain skeleton. Both $R^a$s are not hydrogens at the same time.

Examples of the compound represented by the formula (1) include:

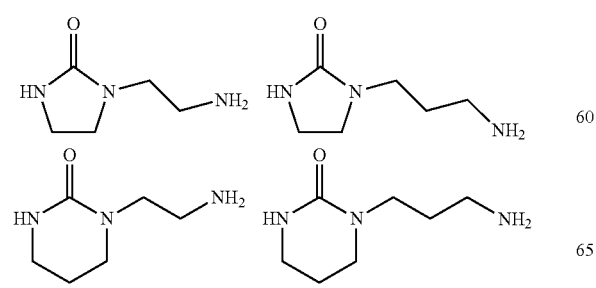

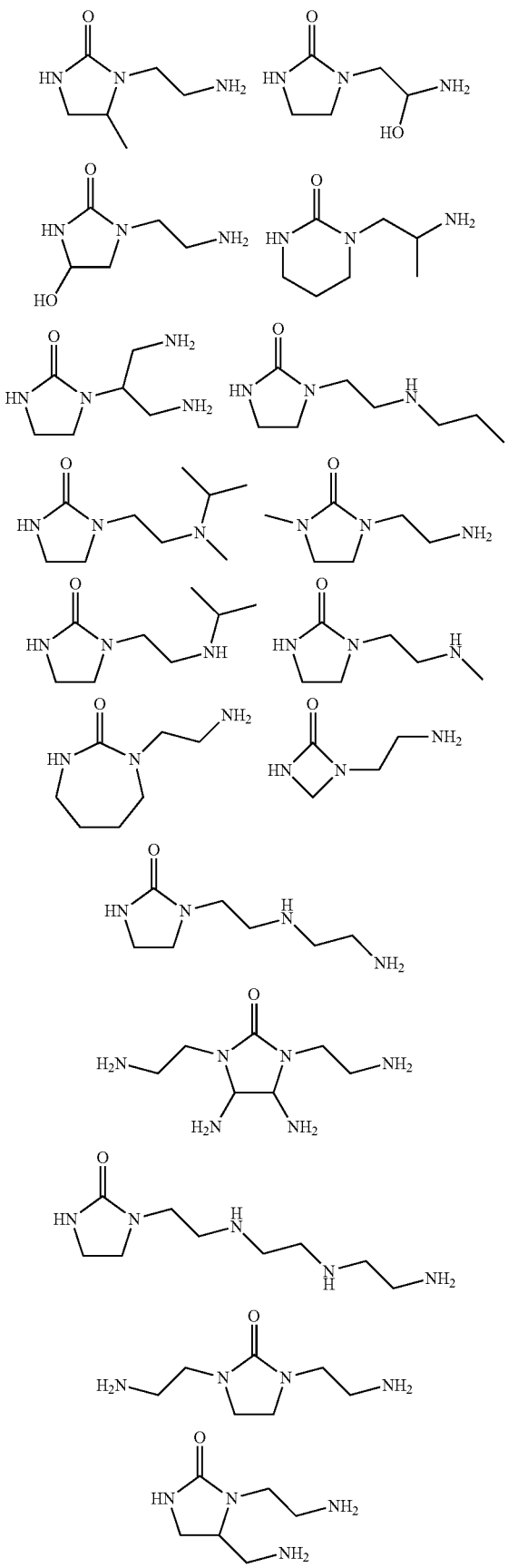

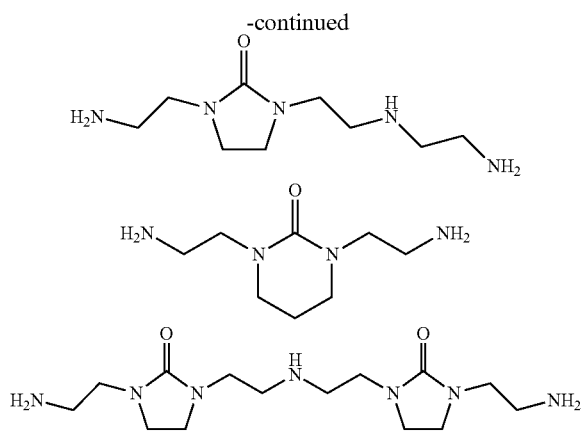

Preferred examples of the amine compound represented by the formula (1) include:
1-(2-aminoethyl)-imidazolid in-2-one,
1-(3-propyl)-Imidazolidin-2-one,
1-(2-aminoethyl)-hexahydropyrimidine-2-one,
1-(3-propyl)-hexahydropyrimidine-2-one,
1,3-di(2-aminoethyl)-imidazolidin-2-one,
1,3-di(3-propyl)-imidazolidin-2-one,
1,3-di(2-aminoethyl)-hexahydropyrimidine-2-one, and
1,3-di(3-propyl)-hexahydropyrimidine-2-one.

The amine compound adopted in the present embodiment can react with an acidic gas to absorb it, and then also can desorb the absorbed acidic gas, if necessary. The amine compound preferably has a high pKa value for the propose of reacting with an acidic gas. Specifically, the pKa value of the compound is preferably larger than 7, more preferably larger than 8.

The above compounds can be easily produced by reactions of polyamines, such as diethylenetriamine, with urea and the like. The compounds thus obtained by the reactions may be purified and then used for the absorbents. However, even if containing polyamines as impurities, they are not degraded in acidic gas absorbability.

Those compounds can be used singly or in combination of two or more. The acidic gas absorbent contains the particular amine compound represented by the formula (1) in an amount of preferably 3 to 80 wt %, more preferably 5 to 75 wt %.

It is generally preferred for the amine concentration to be high in view of energy consumption, plant scale and processing efficiency. That is because carbon dioxide is absorbed and desorbed in large amounts per unit volume and further the rates thereof are high when the amine compound is contained in a high concentration.

However, if the amine concentration is too high, the absorbent may have increased viscosity. This tendency is not observed when the absorbent contains the amine compound of the formula (1) in an amount of 75 wt % or less. On the other hand, if the amine compound of the formula (1) is contained in an amount of 5 wt % or more, carbon dioxide can be absorbed in a sufficient amount at a favorable rate to realize excellent processing efficiency.

When adopted for recovering $CO_2$, the acidic gas absorbent containing the amine compound of the formula (1) in an amount within the above range is not only capable of absorbing $CO_2$ in a large amount at a high rate but also capable of desorbing $CO_2$ in a large amount at a high rate. Accordingly, the absorbent has the advantage of efficiently recovering carbon dioxide. In addition, the absorbent is also favorable in view of having such low diffusibility that the compound is emitted into the environment in only a small amount.

In the present embodiment, for example, an aqueous solution of the amine compound (1) can be adopted as the acidic gas absorbent, which is particularly preferred in view of $CO_2$ absorption capacity and rate per unit mol and per unit volume of the absorbent. Further, energy for separating the acidic gas after $CO_2$ absorption (namely, desorption energy) can be so lowered as to reduce energy for regenerating the absorbent.

<Optional Ingredients>

The acidic gas absorbent according to the embodiment contains the amine compound of the formula (1), and it can further contain other optional ingredients according to necessity.

Examples of the optional ingredients include aminoalcohols, which can improve, for example, absorption capacity, desorption amount, absorption rate and the like of the acidic gas absorbent.

Preferred examples of the aminoalcohols include: monoethanolamine, 2-amino-2-methyl-1-propanol, 2-amino-2-methyl-1,3-dipropanol, diethanolamine, bis(2-hydroxy-1-methyethyl)amine, methyldiethanolamine, dimethylethanolamine, diethylethanolamine, triethanolamine, dimethylamino-1-methylethanol, 2-methylaminoethanol, 2-ethylaminoethanol, 2-propylaminoethanol, n-butylaminoethanol, 2-(isopropylamino)ethanol, 3-ethylaminopropanol, triethanolamine, and diethanolamine. Those compounds can be used singly or in combination of two or more.

Among those compounds, it is preferred to select at least one alkanolamine from the group consisting of 2-(isopropylamino)ethanol and 2-amino-2-methyl-1-propanol in view of improving the reactivity between the acidic gas and the amine compound represented by the formula (1).

When those aminoalcohols are incorporated, the amount thereof is preferably 1 to 30 vol % based on 100 vol % of the amine compound represented by the formula (1).

Further, the absorbent can also contain cyclic amine compounds.

Examples of the cyclic amine compounds include: azetidine, 1-methylazetidine, 1-ethylazetidine, 2-methylazetidine, 2-azetidylmethanol, 2-(2-aminoethyl)azetidine, pyrrolidine, 1-methylpyrrolidine, 2-methylpyrrolidine, 2-butylpyrrolidine, piperidine, 1-methylpiperidine, 2-ethylpiperidine, 3-propylpiperidine, 4-ethylpiperidine, hexahydro-1H-azepine, piperazine and piperazine derivatives.

Among them, piperazine derivatives are particularly preferred in view of improving $CO_2$ absorption amount and rate of the absorbent.

A piperazine derivative is a kind of secondary amine compounds, and hence has a secondary amino group. In the early stage of the reaction, the nitrogen atom in the secondary amino group is combined with carbon dioxide to form a carbamate ion and thereby the derivative contributes toward improvement of the absorption rate. Further, also in the later stage of the reaction, the nitrogen atom in the secondary amino group plays the role of converting the combined carbon dioxide into a bicarbonate ion ($HCO_3^-$) and thereby the derivative contributes toward improvement of the absorption rate.

The piperazine derivative is preferably at least one selected from 2-methylpiperazine, 2,5-dimethylpiperazine or 2,6-dimethylpiperazine. Further, hexamethylenetetramine can be also used in combination with the amine compound represented by the formula (1).

The absorbent according to the embodiment may contain a solvent such as water. When water is used as the solvent, the amount thereof is preferably 20 to 60 wt %, more preferably 30 to 60 wt % (provided that the whole amount of the absorbent is regarded as 100 wt %). The amount of water is preferably within the above range in view of preventing viscosity increase of the absorbent and of inhibiting foaming when the absorbent absorbs carbon dioxide.

Further, examples of the optional ingredients also include oxidation inhibitors, pH adjusters, defoaming agents, and anticorrosive agents.

Preferred examples of the oxidation inhibitors include: dibutylhydroxytoluene (BHT), butylhydroxyanisole (BHA), sodium erythorbate, sodium nitrite, sulfur dioxide, 2-mercaptoimidazole and 2-mercaptobenzimidazole. When the oxidation inhibitor is incorporated, the amount thereof is preferably 0.01 to 1 wt %, more preferably 0.1 to 0.5 wt % (provided that the whole amount of the absorbent is regarded as 100 wt %). The oxidation inhibitor can inhibit deterioration of the absorbent to extend the working lifetime thereof.

Preferred examples of the defoaming agents include: silicone defoaming agents and organic defoaming agents. When the defoaming agent is incorporated, the amount thereof is preferably 0.00001 to 0.001 wt %, more preferably 0.0005 to 0.001 wt % (provided that the whole amount of the absorbent is regarded as 100 wt %). The defoaming agent can inhibit foaming of the absorbent so as to prevent decrease of absorption and desorption efficiencies and to keep the absorbent from degradation in fluidity and in circulation efficiency.

Preferred examples of the anticorrosive agents include: phosphate esters, tolyltriazoles, and benzotriazoles. When the anticorrosive agent is incorporated, the amount thereof is preferably 0.00003 to 0.0008 wt %, more preferably 0.00005 to 0.005 wt % (provided that the whole amount of the absorbent is regarded as 100 wt %). The anticorrosive agent prevents corrosion of the plant facilities to extend the working lifetime thereof.

As described above, the acidic gas absorbent of the present embodiment can increase the amount of absorbed acidic gas such as carbon dioxide and also can reduce diffusion of the reaction promoter. In addition, it is only a small amount of energy that is necessary for recovering the acidic gas. Further, since the absorbent contains an amine compound having plural polar hydroxy groups in its molecule, the diffusibility thereof is kept at such a low level as to prevent the compound from leaking out of the reaction apparatus. Accordingly, even if the amine compound is used in combination with a reaction promoter of low vapor pressure, the absorbent can stably process the acidic gas for a long time. Furthermore, the absorbent has not only high reactivity with acidic gases (such as, carbon dioxide ($CO_2$), hydrogen sulfide ($H_2S$) and carbonyl sulfide (COS)) but also excellent solubility in water, and hence is hardly deposited when absorbing those acidic gases.

The acidic gas absorbent containing the compound according to the embodiment is remarkably improved in absorption capacity of acidic gases (particularly, carbon dioxide) per unit mol and in absorption capacity and rate of acidic gases per unit volume of the absorbent. Further, the absorbent of the embodiment also can reduce the amounts of amines emitted from the absorption tower and the regeneration tower.

<Acidic Gas Removal Method>

In the acidic gas removal method according to the embodiment, a gas containing an acidic gas is brought into contact with the above acidic gas absorbent so as to remove the acidic gas from the acidic gas-containing gas.

The acidic gas removal method of the embodiment basically comprises: a step (absorption step) In which the aforementioned absorbent of the embodiment is made to absorb an acidic gas; and another step in which the acidic gas-holding absorbent of the embodiment is made to release the absorbed acidic gas.

Specifically, the acidic gas removal method according the embodiment essentially comprises: a step (acidic gas absorption step) in which an acidic gas-containing gas (e.g., exhaust gas or the like) is brought into contact with the acidic gas absorbent so that the acidic gas is absorbed in the absorbent; and another step (acidic gas separation step) in which the acidic gas-holding absorbent obtained in the above acidic gas absorption step is heated to desorb and remove the acidic gas from the absorbent.

There are no particular restrictions on how an acidic gas-containing gas is brought into contact with an aqueous solution containing the above acidic gas absorbent. For example, the acidic gas-containing gas may be bubbled in the absorbent; the absorbent may be sprayed in the form of mist into a stream of the acidic gas-containing gas (spray method); or otherwise the acidic gas-containing gas may be brought into countercurrent contact with the absorbent in an absorption unit filled with a ceramic or metal mesh filler.

When the aqueous absorbent solution is made to absorb the acidic gas-containing gas, the temperature of the absorbent is preferably room temperature to 60° C. or less, more preferably 50° C. or less, further preferably 20 to 45° C. The lower the treating temperature is, the more the acidic gas is absorbed. However, the lower limit of the treating temperature can be determined according to the gas temperature in the process and to the heat recovery target or the like. The pressure in the step of absorbing the acidic gas is normally near atmospheric pressure. Although the pressure can be increased to enhance the absorption performance, the process is preferably carried out at atmospheric pressure so as to save energy consumption used for compression.

In order to separate the acidic gas from the acidic gas-holding absorbent and to recover pure or highly concentrated carbon dioxide, the absorbent may be heated and boiled up in a pot in the same way as distillation, or otherwise the absorbent may be heated while the liquid interface thereof is spread in a plate column, in a spray tower or in a regeneration tower filled with a ceramic or metal mesh filler. As a result of those treatments, the acidic gas is desorbed and released from carbamate anions and/or bicarbonate ions.

When the acidic gas is desorbed, the acidic gas absorbent is kept at a temperature of normally 70° C. or more, preferably 80° C. or more, further preferably 90 to 120° C. The higher the temperature is, the more the acidic gas is desorbed. However, in order to raise the temperature, it is necessary to increase energy for heating the absorbent. Accordingly, the temperature can be determined according to the gas temperature in the process and to the heat recovery target or the like. The pressure in the step of desorbing the acidic gas can be normally set at about 1 to 3 atm. Although the pressure can be reduced to enhance the desorption performance, the process is preferably carried out in the above range so as to save energy consumption used for pressure reduction.

After the acidic gas is desorbed, the acidic gas absorbent can be recycled and reused in the acidic gas absorption step. In addition, heat generated in the step of absorbing the acidic gas is generally cooled in a heat exchanger and used for preheating the aqueous solution supplied to the regeneration unit where the solution is processed for recycling.

The thus recovered acidic gas normally has such a high purity as 95 to 99 vol %. This pure or highly concentrated acidic gas can be utilized as a material for synthesizing chemicals and/or polymers or as a coolant for food freezing. Further, the recovered gas also can be subjected to segregated storage in the ground or the like by use of technologies under development.

Among the above steps, the most energy is consumed in the step where the acidic gas is desorbed from the acidic gas absorbent to regenerate the absorbent. Specifically, this step often consumes about 50 to 80% of the energy used in all the steps. Accordingly, if it is realized to reduce energy consumption in the step of regenerating the absorbent, it becomes possible to lower the cost for absorbing and desorbing the acidic gas and, as a result, the acidic gas can be removed from exhaust fumes efficiently and economically advantageously.

The acidic gas absorbent according to the embodiment can reduce energy necessary for desorbing the acidic gas (namely, for the regeneration step), and therefore the $CO_2$ absorption and desorption steps can be carried out efficiently and economically advantageously.

Further, the amine compound according the embodiment has remarkably high anticorrosive properties for metallic materials such as carbon steel, as compared with alkanol amines, such as 2-aminoethanol, which are conventionally used as acidic gas absorbents. Accordingly, for example, in plant construction, the acidic gas removal method adopting the above absorbent makes it unnecessary to use very costly corrosion-resistant steel of high quality. The method according to the embodiment is thus advantageous in cost.

<Acidic Gas Removal Apparatus>

The acidic gas removal apparatus according to the embodiment comprises:

an absorption unit in which a gas containing an acidic gas is brought into contact with the aforementioned first or second acidic gas absorbent, so that the absorbent absorbs the acidic gas to remove it from the acidic gas-containing gas; and a regeneration unit in which the absorbent holding the acidic gas is made to desorb the acidic gas so as to be regenerated;

so that the absorbent regenerated in the regeneration unit is reused in the absorption unit.

FIG. 1 schematically shows the acidic gas removal apparatus according to the embodiment.

The acidic gas removal apparatus 1 comprises: an absorption unit 2 in which a gas containing an acidic gas (e.g., exhaust gas) is brought into contact with the acidic gas absorbent, so that the absorbent absorbs the acidic gas to remove it from the acidic gas-containing gas; and a regeneration unit 3 in which the absorbent holding the acidic gas is made to desorb the acidic gas so as to be regenerated.

In the following description, the explanation is given in case examples where the acidic gas is carbon dioxide.

As shown in FIG. 1, a discharge gas containing $CO_2$, such as, a combustion exhaust gas emitted from a thermal power plant or the like, is introduced through a gas inlet 4 into the lower part of the absorption unit 2. The discharge gas is confined in the absorption unit 2 and brought into contact with an acidic gas absorbent supplied from an absorbent inlet 5 provided on the upper part of the unit. As the acidic gas absorbent, the aforementioned absorbent of the embodiment is employed.

The pH value of the absorbent must be adjusted at 9 or more, but it is preferred to control the pH value optimally according to various conditions, such as, the substance, concentration and flow rate of the harmful gas contained in the discharge gas.

The acidic gas absorbent may contain not only the aforementioned amine compound and the solvent such as water, but also other compounds, such as, nitrogen-containing compounds that improve $CO_2$ absorption performance, antioxidants and pH adjusters, in desirable amounts.

In the way described above, as the result of contact with the acidic gas absorbent, carbon dioxide is absorbed in the absorbent and thereby removed from the discharge gas. After treated to remove carbon dioxide, the discharge gas is emitted through a gas outlet 6 from the absorption unit 2.

The $CO_2$-holding absorbent is then sent to a heat exchanger 7 and a heater 8. After heated, the absorbent is introduced into the regeneration unit 3. In the regeneration unit 3, while the absorbent is moved down from the upper part to the lower part, the acidic gas is desorbed from the absorbent and thereby the absorbent is regenerated.

The absorbent regenerated in the regeneration unit 3 is sent by a pump 9 to the heat exchanger 7 and an absorbent cooler 10, and then returned into the absorption unit 2 through the absorbent inlet 5.

On the other hand, at the upper part of the regeneration unit 3, the acidic gas released from the absorbent is brought into contact with reflux water supplied from a reflux drum 11. The water is then transferred out of the regeneration unit 3.

The $CO_2$-containing reflux water is cooled with a reflux condenser 12, and thereafter separated in the reflux drum 11 into water and a liquid component condensed from water vapor accompanying $CO_2$. The liquid component is sent through an acidic gas recovering line 13 for the step of recovering the acidic gas. Meanwhile, the reflux water separated from the acidic gas is sent by a reflux water pump 14 into the regeneration unit 3.

The acidic gas removal apparatus 1 thus employs the acidic gas absorbent excellent in acidic gas absorption and desorption performance, and thereby makes it possible to absorb and remove acidic gases efficiently.

EXAMPLES

Example 1

In water, 1-(2-aminoethyl)-imidazolidin-2-one was dissolved so that the concentration thereof might be 30 wt %, to prepare an aqueous solution (which is hereinafter referred to as "absorbent"). The absorbent was placed in a test tube, heated at 40° C., and bubbled at a flow rate of 500 mL/minute with a gas mixture containing 10 vol % of carbon dioxide ($CO_2$) and 90 vol % of nitrogen ($N_2$). At the mouth of the test tube, the $CO_2$ concentration was then measured to evaluate the absorption performance by means of an infrared gas analyzer (CARBOCAP [trademark] GMM111 $CO_2$ module (0 to 20%), manufactured by Vaisala).

Further, while the above aqueous amine solution was bubbled with 1% $CO_2$ at 40° C., the diffused amine compound was collected to evaluate the diffusibility.

The amount of $CO_2$ absorption was found to be 0.5 mol per 1 mol of the amine compound in the absorbent. As for the diffusibility, while nitrogen gas was bubbled in the absorbent, the absorbent accompanying nitrogen gas was collected to measure the amine concentration. As a result, the diffusibility was found to be about 1 ppm.

Examples 2 to 5

The procedure of Example 1 was repeated except for replacing 1-(2-aminoethyl)-Imidazolidin-2-one with 1-(3-propyl)-imidazolidin-2-one (Example 2), 1-(2-aminoethyl)-hexahydropyrimidine-2-one (Example 3), 1-(3-propyl)-hexahydropyrimidine-2-one (Example 4) or 1,3-di(2-aminoethyl)-imidazolidin-2-one (Example 5), to prepare an absorbent. The amounts of $CO_2$ absorption, amine recovery and diffusion were evaluated with the same apparatus under the same conditions as in Example 1.

The absorbents of Examples 2 to 4 showed similar amounts of $CO_2$ absorption and diffusion to those in Example 1. The absorbent of Example 5 absorbed $CO_2$ about twice as much as that of Example 1, and the diffusibility thereof was found to be smaller than that in Example 1.

Comparative Example 1

In water, monoethanolamine was dissolved so that the concentration thereof might be 30 wt %, to prepare an aqueous solution. Thereafter, the amounts of $CO_2$ absorption, amine recovery and diffusion were evaluated with the same apparatus under the same conditions as in Example 1.

The amount of $CO_2$ absorption was found to be 0.5 mol per 1 mol of the amine compound in the absorbent, and hence was similar to that in Example 1. However, the diffusibility thereof was found to be about 18 ppm (v/v).

<Results>

As evident from the above results, as for the $CO_2$ absorption amount, the absorbents of Examples according to the embodiment were similar or superior to that of Comparative example. As for the diffusibility, the absorbents of Examples were remarkably improved as compared with that of Comparative example.

It can be thus realized at the same time to absorb acidic gases such as carbon dioxide in large amounts and to reduce diffusion of the amine compounds by use of at least one of the embodiments, namely, the acidic gas absorbent, the acidic gas removal method and the acidic gas removal apparatus.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and sprit of the invention.

The invention claimed is:
1. A composition comprising: water and an amine compound selected from the group consisting of

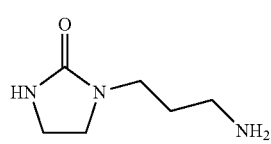
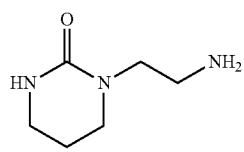
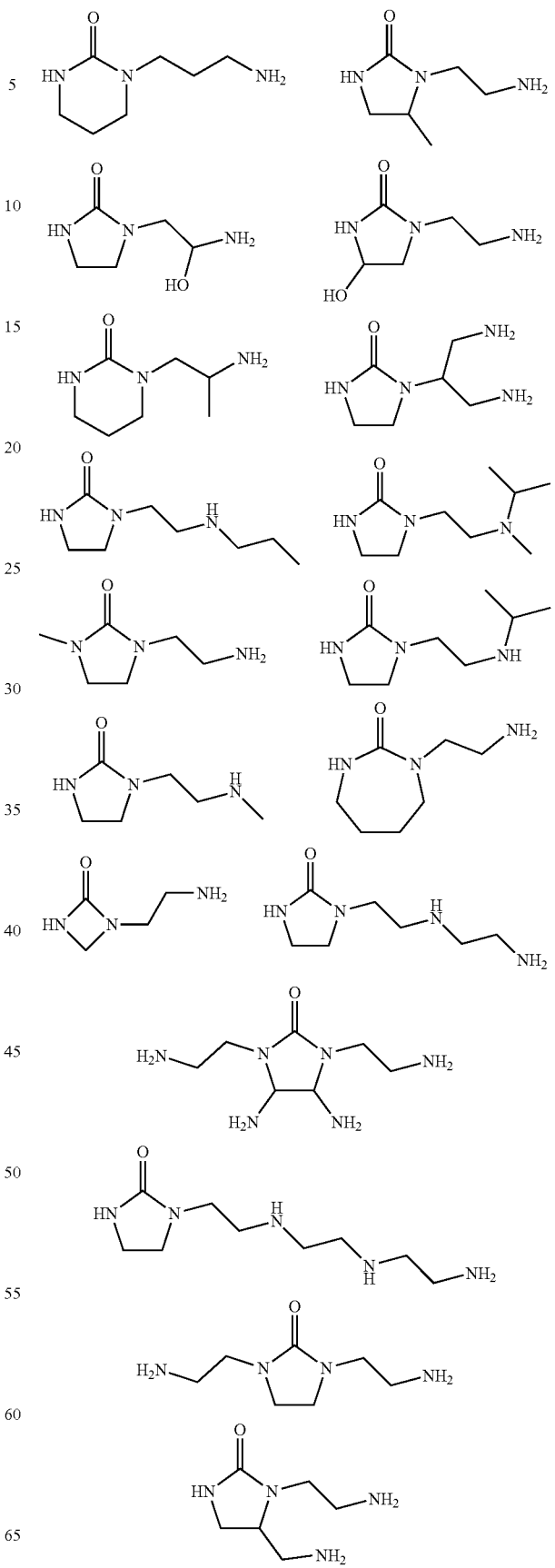

-continued

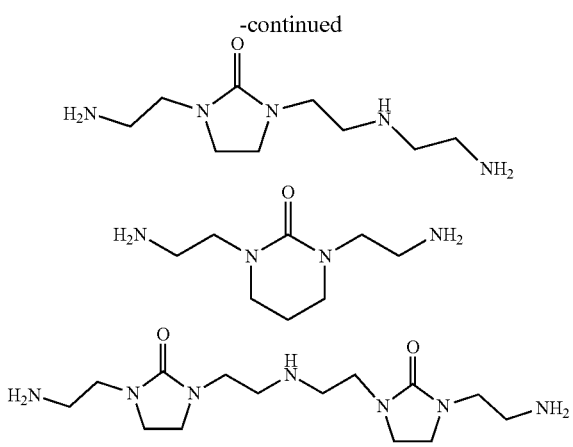

and further comprising an aminoalcohol or a piperazine derivative.

2. The composition according to claim 1, wherein said amine compound is at least one selected from the group consisting of:
1-(3-aminopropyl)-imidazolidin-2-one,
1-(2-aminoethyl)-hexahydropyrimidine-2-one,
1-(3-aminopropyl)-hexahydropyrimidine-2-one,
1,3-di(2-aminoethyl)-imidazolidin-2-one, and
1,3-di(2-aminoethyl)-hexahydropyrimidine-2-one.

3. The composition according to claim 1, which comprises an amine compound represented by the formula (1) in an amount of 3 to 80 wt % provided that the whole amount of the absorbent is regarded as 100 wt %.

4. The composition according to claim 1, further comprises at least one additive agent selected from the group consisting of oxidation inhibitors, pH adjusters, defoaming agents, and anticorrosive agents.

5. An acidic gas removal method in which
a gas containing an acidic gas is brought into contact with the composition according to claim 1 so as to remove the acidic gas from the acidic gas-containing gas.

6. An acidic gas removal apparatus comprising: an absorption unit comprising the composition according to claim 1 and a gas containing an acidic gas, wherein the gas containing the acidic gas is brought into contact with the composition according to claim 1 within the absorption unit, so that the composition according to claim 1 absorbs the acidic gas to remove it from the acidic gas-containing gas, thereby causing the composition of claim 1 to hold the acidic gas; and a regeneration unit, in which the composition of claim 1 holding the acidic gas is made to desorb the acidic gas to regenerate the composition of claim 1; wherein the regenerated composition of claim 1 is thereafter reused in the absorption unit.

* * * * *